(12) United States Patent
Faulstich et al.

(10) Patent No.: US 8,840,444 B2
(45) Date of Patent: Sep. 23, 2014

(54) METHOD FOR MACHINING THE FLANKS OF SUBSTANTIALLY CYLINDRICAL GEARING HAVING MODIFIED CROWNING, IN A DIAGONAL ROLLING METHOD

(75) Inventors: Ingo Faulstich, Ludwigsburg (DE); Wilfried Heidelmann, Ludwigsburg (DE)

(73) Assignee: Gleason-Pfauter Maschinenfabrik GmbH, Ludwigsburg (DE)

( * ) Notice: Subject to any disclaimer, the term of this patent is extended or adjusted under 35 U.S.C. 154(b) by 640 days.

(21) Appl. No.: 13/127,811

(22) PCT Filed: Nov. 24, 2009

(86) PCT No.: PCT/EP2009/008363
§ 371 (c)(1),
(2), (4) Date: Jun. 1, 2011

(87) PCT Pub. No.: WO2010/060596
PCT Pub. Date: Jun. 3, 2010

(65) Prior Publication Data
US 2011/0250029 A1  Oct. 13, 2011

(30) Foreign Application Priority Data
Nov. 25, 2008  (EP) .................................... 08020426

(51) Int. Cl.
*B23F 19/02* (2006.01)
*B23F 21/18* (2006.01)
*B23F 19/00* (2006.01)
*B23F 5/20* (2006.01)

(52) U.S. Cl.
CPC .............. *B23F 19/002* (2013.01); *B23F 21/18* (2013.01); *B23F 5/20* (2013.01)
USPC ........................................................... 451/47

(58) Field of Classification Search
CPC .............. B23F 1/02; B23F 1/023; B23F 5/02; B23F 5/04; B23F 5/06; B23F 5/065; B23F 5/08; B23F 5/085; B23F 5/10; B23F 5/20; B23F 19/02; B23F 21/18
USPC ........................................................... 451/47
See application file for complete search history.

(56) References Cited

U.S. PATENT DOCUMENTS 4,850,155 A * 7/1989 Sulzer .............................. 451/47
5,765,974 A * 6/1998 Faulstich ........................ 409/51
(Continued)

FOREIGN PATENT DOCUMENTS

| DE | 3704607 A1 | 8/1988 |
|----|-----------|--------|
| EP | 1036624 A2 | 9/2000 |
| EP | 1995010 A1 | 11/2008 |

OTHER PUBLICATIONS

English translation of International Search Report and Written Opinion for PCT/EP2009/008363.
(Continued)

*Primary Examiner* — Maurina Rachuba
(74) *Attorney, Agent, or Firm* — Robert L. McDowell (57) ABSTRACT

The invention concerns a method of machining the tooth flanks of substantially cylindrical, but crowning-modified gears through a diagonal generating process employing a worm-shaped tool which is modified with a crowning in the direction of its rotary axis, wherein the crowning can be positive or negative (concave crowning), wherein by matching the crowning of the tool to the diagonal ratio, a flank twist is generated by means of the tool and superimposed on the natural flank twist, such that the result of said superposition equals the flank twist required for the work piece.

13 Claims, 4 Drawing Sheets

(56) References Cited

U.S. PATENT DOCUMENTS

| | | | |
|---|---|---|---|
| 6,217,409 B1* | 4/2001 | Stadtfeld et al. | 451/5 |
| 6,422,924 B1* | 7/2002 | Faulstich et al. | 451/47 |
| 7,937,182 B2* | 5/2011 | Faulstich | 700/192 |
| 2008/0292420 A1* | 11/2008 | Faulstich | 409/8 |

OTHER PUBLICATIONS

International Search Report & Written Opinion for PCT/EP2009/008363.

English translation of International Preliminary Report on Patentability for PCT/EP2009/008363.

* cited by examiner

METHOD FOR MACHINING THE FLANKS OF SUBSTANTIALLY CYLINDRICAL GEARING HAVING MODIFIED CROWNING, IN A DIAGONAL ROLLING METHOD

The invention concerns a method of machining the tooth flanks of substantially cylindrical, but crowning-modified gears using a diagonal generating process in accordance with the introductory portion of claim 1.

When helically-toothed, crowning-modified cylindrical gear wheels are generated by a continuous generating method, the tooth flanks resulting from the process will be twisted. A quantitative measure for this property is the flank twist. The task required here is to avoid the flank twist, or to generate a flank twist that deviates from the "natural flank twist".

To solve the task of avoiding the flank twist, the existing state of the art (DE 37 04 607) offers the solution of machining the gear teeth with a diagonal generating method, using a worm-shaped tool whose angle of engagement of the right or left flanks, starting from a maximum value at one end, continuously decreases towards the other end, wherein the maximum angle of engagement of the right flanks at one end of the worm-shaped tool coincides with the minimum angle of engagement of the left flanks and vice versa. This tool is very expensive to produce and offers little flexibility in its use.

A concept proposed in EP 1 036 624 A2 is to use a worm tool with a modified pitch. In this tool, the helix pitch of the flanks, starting from one end of the worm tool, changes towards the other end in proportion to the distance from the end of the worm tool, wherein the maximum pitch of one flank at one end of the worm tool coincides with the minimum pitch of the other flank at the same end and vice versa. A tool of this type is convex- or concave-crowned over its width. The tool is intended to operate in the diagonal mode.

When a convex- or concave-crowned tool is used in the diagonal mode, the work piece will end up with a flank twist. This flank twist can be divided into two components, as will be shown in the following. The first component is the same as described in EP 1 036 624 A2. The second component is of a heretofore unidentified nature. Only through this second component will if be possible in a work piece with a given widthwise crowning to avoid the flank twist or to bring it to a desired value.

The task set for this invention is to further develop the generically defined method in such a way that crowning-modified flanks can be generated in a one-flank- or two-flank process with a practically any desired flank twist, that geometrically simple tools can be used, that the tool length required for the machining is within wide limits freely selectable, and that the process can also be performed with short tools.

This task is solved in the generic method according to the introductory portion of claim 1 with the features according to the characterizing portion of claim 1. Preferred forms of the method are presented in the dependent claims.

Due to the matching of the crowning of the tool to the diagonal ratio, a simple tool generates a flank twist that is superimposed on the natural flank twist, so that the flank twist as required for the work piece is obtained. Also, superimposed on that component of the crowning of the work piece which is due to the crowning of the tool when working in the diagonal mode is a further component of the crowning, so that as a result of the superposition the work piece has the required crowning, wherein the further component of the crowning is generated by varying the distance between the tool and the work piece during the machining. It is possible to generate the required values for widthwise crowning and flank twist of the work piece with tools whose length can be freely selected within wide limits. The crowning of the tools will then have to be adapted to their length. With the proposed measures the task defined above is solved in a simple manner using simple tools.

Further features of the invention are presented in the further claims, the description and the drawings. The invention is explained in more detail with the help of the following drawings, wherein:

The following observations will explain how in the machining of helically toothed, crowning-modified cylindrical gear wheels by a continuous generating process the twisting of the flanks comes about, how it can be avoided or brought to a desired magnitude, and how the tools that are necessary for this process are designed.

Figure 1:
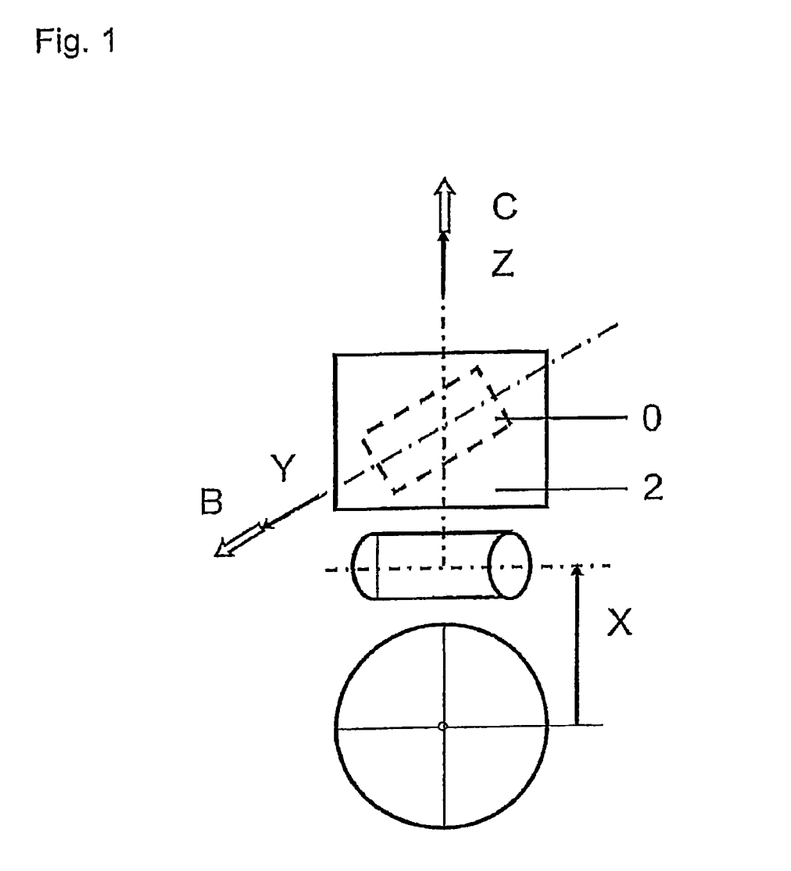
FIG. 1 shows a tool 0, a work piece 2, as well as axes of a machine tool as an aid in describing positions, distances and movements.
Figure 2:
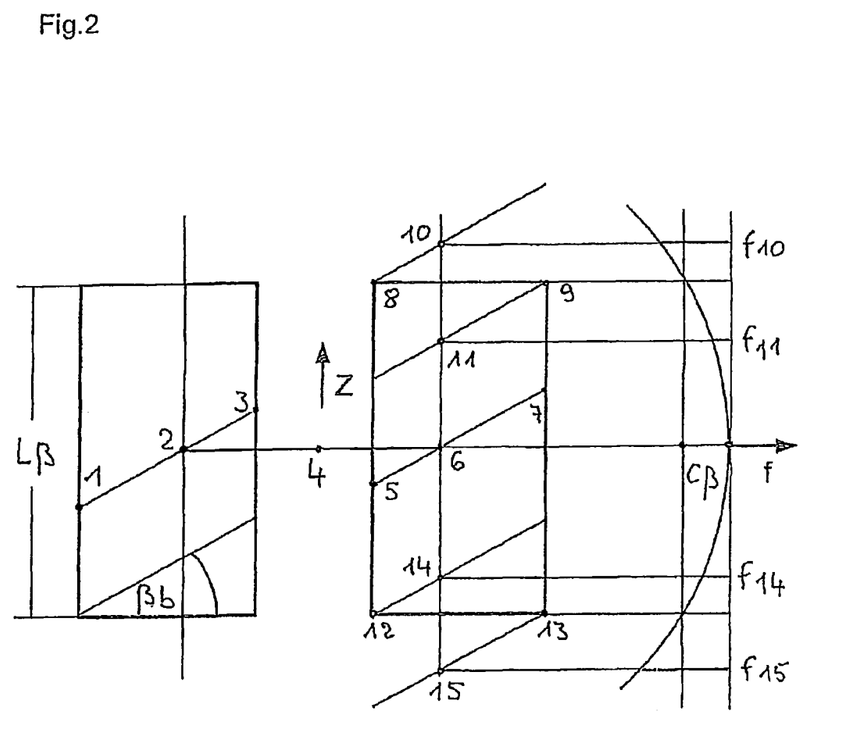
FIG. 2 illustrates the determination of the flank topography of the left and right flanks of a right-handed helical gear with widthwise crowning generated in a diagonal generating process with a cylindrical tool.

These observations are based on the assumption of a machine tool with a vertical axis of rotation of the work piece as used in a conventional generating method. The axes that serve to describe the positions, paths and movements of tool 0 and work piece 2 (FIG. 1) are:

X distance between the axes (radial)
Y direction of the tool axis (tangential)
Z direction of the work piece axis (axial)
A tilt of tool axis
A rotation of tool
C rotation of work piece The flanks of the cylindrical gears discussed here are, in the absence of any modifications, formed by involute screw surfaces. However, the latter do not lend themselves easily for an explanation of quantitative relationships. In the following, the flanks will therefore be represented in a tangential plane of the base cylinder (FIG. 2). In this representation, the geometrically complicated involute screw surfaces are transformed into rectangles with the sides $L_\alpha$ and $L_\beta$. Such rectangles will hereinafter be referred to as "measurement fields".

When a gear wheel is turned about its axis, the points where helix lines intersect the measurement field form straight vertical lines. Normal sections (orthogonal to the axis) of the gear wheel intersect the measurement field along straight horizontal lines. The points of contact between a worm-shaped tool and a perfectly machined flank also lie on straight lines, the generation contact lines. The latter are inclined relative to the normal section by the base helix angle $\beta_b$, as long as the axial rate of advancement is small. This condition is met in the cases being discussed here. If necessary, the influence that the rate of advancement has on the slope angle can be calculated based on known relationships, and the exact angle can be used for the further discussions.

In FIG. 2, the straight lines 1,2,3 and 5,6,7 which cross the flank at an oblique angle are generation contact lines. If the generation contact lines of the left flanks L and the right flanks R are held rigidly connected to each other through the line that runs through the point 4 and if the point 4 is moved in the direction Z, the straight lines will define the geometry of the flanks being generated. Now, while moving the point 4 in the direction Z, if one raises the point, and thus raises the generation contact lines, in accordance with the crowning curve drawn in the right-hand portion of the diagram, the generation contact lines each define a closed surface area over the respective measurement field of the left and the right flank. These surface areas envelop the flanks that are generated; they represent the topography of the widthwise crowned flanks generated with a cylindrical tool.

In the machining of a work piece according to the continuous generating process, the flanks being generated on the work piece have the property that points of the left flank and the right flank have practically the same Z-position on the pitch cylinder; thus there will be practically no offset between the generation contact lines.

If one of the envelope surfaces, for example the envelope surface of the right flank, is intersected with a normal section, the line of intersection represents the profile deviation of this flank in the selected normal section. If the envelope surface is intersected with a circular cylinder that is concentric to the gear shaft or, in reference to FIG. 2, with a plane that is perpendicular to the measurement field and perpendicular to the normal section, the line of intersection represents the deviation of the flank contour line on the selected cylinder. With the help of a computer, the profile deviations and flank contour line deviations that are of interest can be reliably determined by following the method explained here, and from the deviation curves the respective angular deviations can be calculated. The profile deviations and contour line deviations measured, respectively, in two planes of a flank are required in order to determine the twist of a flank. Based on the deviations of the profile angle, the flank twist $S_\alpha$ can be calculated as follows:

$$S_\alpha = f_{H\alpha II},$$

wherein $f_{H\alpha I}$ and $f_{H\alpha II}$ are the respective profile angle deviations in the planes I (front) and II (back) of the gear wheel.

The desired crowning profile can in most cases be described by a quadratic parabola. The twist of a flank can in these cases be calculated based on the perpendicular height of the envelope surface area above or below the four corner points of the measurement field. The four corner points of the measurement field of the right flank in FIG. 2 are 8, 9, 13, 12. All points of a generation contact line in FIG. 2 have, with good approximation, the same height above or below the measurement field, if the tool is cylindrical. Using the symbol f for the respective heights, the following applies:

$$f_{H\alpha I} = f_{11} - f_{10} \text{ and}$$

$$f_{H\alpha II} = f_{15} - f_{14}.$$

By calculating the individual heights over the range of the quadratic parabola that describes the crowing profile of the work piece, it is possible to express the twist of the flank in a simple equation. Taking into account that the crowning in the present case was generated in accordance with the existing state of the art, i.e. for example by varying the distance X between the axes of the tool 0 and the work piece 2 during the advance of the axial carriage in the direction Z according to FIG. 1, or in other words by way of the function X(Z), the flank twist calculated here can be called the natural flank twist $S_{nat1}$, which can be expressed as $$S_{nat1} = k_1 \times c_{\beta x}, \text{ wherein}$$

$k_1$ is a constant which is obtained through the calculation explained above, and $c_{\beta x}$ is the crowning of the work piece generated over X(Z).

Figure 3:
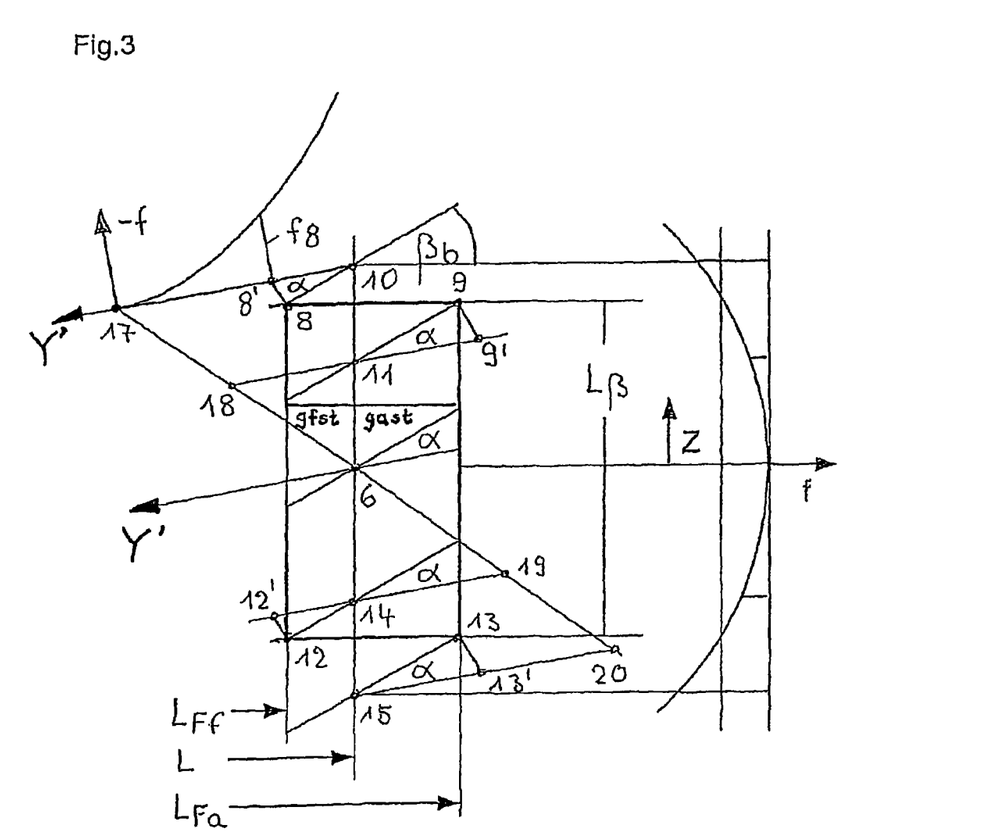
FIG. 3 illustrates the determination of the flank topography of the right flank of a right-handed helical gear with widthwise crowning generated in a diagonal generating process with a modified, concave-crowned tool.

If, in order to generate a crowning of the work piece, a worm-shaped tool is used which is modified with a crowning in the direction of its rotary axis, this will likewise result in a flank twist when working in a diagonal mode. The calculation of this flank twist is not as simple as the calculation of the natural flank twist. The following discussion concerns the use of a concave-crowned tool in the machining of the right tooth flanks of a right-hand helical gear in the diagonal process. The distance between tool and work piece is assumed to be constant. In the transformation of the generation contact lines onto the drawing plane, one again obtains straight lines which are inclined at an angle $\beta_b$ relative to the normal section. However, in the dimension perpendicular to the measurement field the generation contact lines are not rectilinear; they can in fact be described as part of the crowning that was given to the tool. FIG. 3 shows—flipped into the drawing plane—the crowning $c_{\beta y}$ of the work piece which results from the crowning of the tool.

As the machining is performed in the diagonal process, all generation contact lines that are in different Z-positions have different curve shapes perpendicular to the measurement field. This curve shape can be calculated. Thus it is again possible to calculate the modification surface that envelops the flank. By analyzing the shapes of the lines of intersection between the envelope surface and the normal sections in the planes I and II, one obtains, respectively, $f_{H\alpha I}$ and $f_{H\alpha II}$ and thus the twist of the flank.

For this calculation, it is necessary to know the correlation between the positions Y of the tool and the positions Z of the generation contact line of the selected generation contact line. The location referred to as Z-position of a generation contact line is the Z-position of the point of intersection of the axes B and C (see FIG. 1). As the flank line is defined in reference to the pitch cylinder, this intersection lies at the generating path L to the pitch cylinder. For this correlation between the axes Y and Z, the diagonal ratio D is appropriate, which can be expressed as $$D = \Delta Y / \Delta Z = (Y_e - Y_a)/(Z_e - Z_a), \text{ wherein}$$

$\Delta Y$ is the displacement component of the tool in the direction of its own axis of rotation, $\Delta Z$ is displacement component of the tool in the direction of the axis of rotation of the work piece, $Y_e$ is the end position of the tool on the Y-axis, $Y_a$ is the starting position of the tool on the Y-axis, $Z_e$ is the end position of the tool on the Z-axis, and $Z_a$ is the end position of the tool on the Z-axis.

FIG. 3 shows the measurement field of the right tooth flank of a right-handed helical gear with the corner points 8, 9, 13, 12. Point 6 lies at the generating path L to the pitch cylinder in the middle of the tooth width. For the basic synchronization of the axis y of the tool 0 and the axis Z of the work piece 2, the coordinate center of the operating range of the tool is also set at the location of point 6, i.e. Y=0 and Z=0 at point 6. Thus, with the diagonal ratio D, one obtains a uniquely defined correlation between the positions of the tool 0 and the work piece 2.

To represent the location of the point 8 and to calculate the modification $f_8$ at point 8 of the work piece, the tool first has to be moved through the travel segment 6-10 in the direction Z, i.e. by a distance of $L_\beta/2 + gfst \times \tan(\beta_b)$ in the direction Z. The point 10 is traversed by the generation contact line that runs through point 8 and is inclined at an angle $\beta_b$ relative to the normal section. The point 10 is also traversed by the straight line Y' which is inclined at an angle a to the generation contact line. The line Y' runs parallel to the tool axis through the surface line of the reference cylinder of the tool. However, the line Y' does not lie in the drawing plane; rather the axial section profile of the tool is flipped into the drawing plane about the generation contact line that runs through the points 8 and 10. The axial section profile in the illustrated position contains the line 8-8'. The modification of the tool profile at point 8' represents a good approximation for the modification $f_8$ at point 8 of the work piece.

If the tool axis is moved from 6 to 10, the zero point of the worm cutter, for D>0, moves to the left in FIG. 3. The point 10 of the tool now takes the position $Y=-D\times(L_\beta/2+gfst\times\tan(\beta_b))$. This places Y=0 at point 17. The modification $f_8$ in point 8 of the work piece 2 is found on the parabola of the tool modification at the location 8'.

By following the method explained here, the modifications at the points 9, 12 and 13, i.e. $f_9$, $f_{12}$ and $f_{13}$, can likewise be determined. Thus the modification at the location 9 of the work piece corresponds to the modification of the tool at the location 9', with Y=0 being located at point 18. Accordingly, for the calculation of the modifications at the points 12 and 13, the location for Y=0 lies, respectively, at the points 19 and 20.

The flank twist of the work piece generated by diagonal cutting with a crowned tool is distinguished from the flank twist of the work piece that is generated by axial cutting with a cylindrical tool. Under the axial cutting method with a cylindrical tool, the points 8 and 10, 9 and 11, 12 and 14, 13 and 15 lie, respectively, at the same height above or below the measurement field, which is not the case under the diagonal cutting method with a (concave)-crowned tool. Here, the respective amounts for $f_8$, $f_9$, $f_{22}$, $f_{13}$ which determine the flank twist $$S=(f_9-f_8)-(f_{13}-f_{12})$$

have to be calculated. By replacing $f_8$, $f_9$, $f_{12}$, $f_{13}$ with the geometrical quantities according to FIG. 3, one arrives at the flank twist $$S_y=k_1\times c_{\beta y}+k_2\times c_{\beta y}.$$

The constant $k_1$ is known from the calculation of the natural flank twist which occurs with the use of a cylindrical tool. The constant $k_2$ is the result of combining all of the constant quantities which occur in the calculation explained above, leaving out those components of the flank twist which are already accounted for in $k_1\times c_{\beta y}$.

$S_y$ is made up of two components which may be named $S_{nat2}$ and $S_k$. They are defined as $$S_{nat2}=k_1\times c_{\beta y} \text{ and}$$

$$S_k=k_2/D\times c_{\beta y}.$$

The sign of $S_{nat2}$ is determined by the sign of $c_{\beta y}$ ($c_{\beta y}>0$ for a convex-crowned work piece, and $c_{\beta y}<0$ for a concave-crowned work piece). With $c_{\beta y}$ given, the sign of $S_k$ can be determined from the sign of D. Thus, a component of the flank twist is set apart through which a natural flank twist can be increased or reduced, depending on specified requirements.

Now, if the concave-crowned tool is used in the diagonal cutting process and the distance between the axes is varied during the axial carriage movement in the same way as for the generation of a crowning $c_{\beta x}$ with a cylindrical tool, one obtains:

$$c_\beta=c_{\beta x}+c_{\beta y}$$

$$S_{nat}=S_{nat1}+S_{nat2}$$

$$S_k=k_2/D\times c_{\beta y}$$

$$S=S_{nat}+S_k$$

In order to generate a targeted amount of crowning $c_{\beta s}$ and a targeted amount of flank twist $S_s$, the following arrangement is proposed:

$$S_{nat}=k_1\times c_{\beta s}$$

$$S_{ks}=S_s-S_{nat}$$

$$c_{\beta y}=S_{ks}\times D/k_2$$

$$c_{\beta x}=c_{\beta s}-c_{\beta y}$$

$$S_{res}=k_1\times c_{\beta s}+k_2\times c_{\beta y}.$$

$S_{res}$ represents the resultant flank twist.

Occasionally, flank modifications are specified for cylindrical gear wheels which cannot be described through a quadratic parabola, wherein for example the modification in the vicinity of one or both axially facing surfaces of the wheel drop more strongly into the negative than would be the case for a quadratic parabola. Gear wheels of this kind can be machined according to the method described herein as follows: Using conventional means, one subdivides the required modification into a component 1 which optimally approximates the required modification through a modification with a quadratic profile, and a component 2 which makes up the rest of the required modification. The work piece is machined in accordance with one of the claims 6 to 13 in the same way as if the specified modification consisted only of component 1, but superimposing on the axis movements of the machine those additional movements that are required to generate the component 2. This can be accomplished for example through a variation of the axis distance and/or an additional rotation of the work piece table during the axial carriage movement.

What has been said up to this point relates to right flanks of right-handed helical gears. The following applies to the left flanks of right-handed helical gears:

If the machining is performed in a two-flank process according to claim 6, the same crowning will be generated as on the right flank. The natural flank twist will have the same magnitude as on the right flank, but the opposite sign. In the machining of left-handed helical gears in the two-flank process according to claim 6, the same crowning is generated as for right-handed helical gears; the natural flank twist is of the same magnitude as in right-handed helical gears, but of the opposite sign. Thus, the following rule applies: In the machining under the two-flank process according to claim 6, the same crowning is produced if the machine tool is programmed the same way. The natural flank twist on the right flanks of right-hand helical gears and on the left flanks of left-hand helical gears is positive if $c_{\beta y}>0$ and simultaneously D>0; it is negative on the respective opposite flanks.

The effect described above can also be achieved with a convex-crowned tool. However, in contrast to the result with a concave-crowned tool, one obtains $c_{\beta y}<0$ and a natural flank twist of the opposite sign. The sign of D therefore has to be reversed in comparison to the conditions that apply to the use of a concave-crowned tool, in order to reduce the magnitude of a resultant flank twist in comparison to the natural flank twist.

Figure 4:
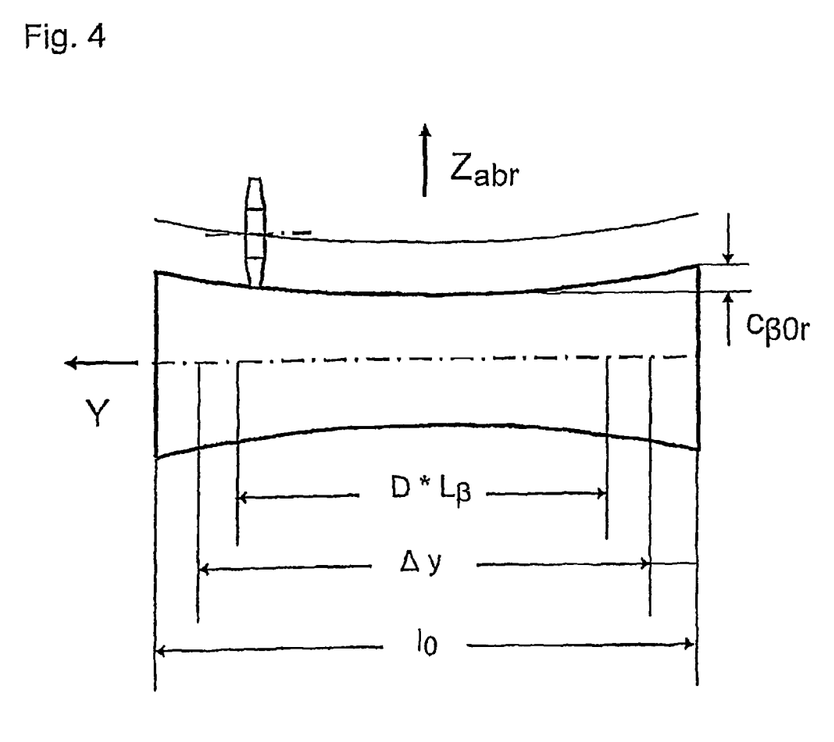
FIG. 4 illustrates a method of generating a convex or concave crowning on a worm-shaped tool.

A particularly simple method of generating the required crowning of the tool is suitable for tools that can be dressed (FIG. 4). The process is performed with a diamond-coated "dual-cone disk". The profiling process differs from the profiling of a cylindrical worm cutter only in that during the movement of the worm cutter in the direction of its own axis the distance $Z_{abr}$ between the profiling disk and the worm cutter is being varied. A defined distance of the profiling disk from the worm axis is set for the middle of the worm cutter and either increased (for a positive crowning of the tool) or decreased (for a negative crowning of the tool) in proportion to the square of the distance from the center of the worm cutter. In the transferring of the worm-cutter modification (as seen in the axial plane of the tool), one has to keep in mind that the change of the axis distance for the profiling has to be multiplied by $\sin(\alpha_n)$ in order to obtain the crowning in the axial-section plane and thus approximately in the plane of a normal section. The transfer of linear distances from the tool axis to the work piece axis takes place by way of the diagonal ratio. FIG. 4 does not show the tooth contours of the tool, but only the (strongly magnified) profile of the modification (as seen in an axial section) which is generated in the profiling of the tool. The magnitude of the concave crowning of the tool in the axial-section plane is $c_{\beta 0r}$. If the tool is being profiled over a length of $l_0$ and if a crowning of $c_{\beta y}$ is to be produced, $c_{\beta 0r}$ has to satisfy the following equation:

$$c_{\beta 0r} = c_{\beta y}/\sin(\alpha_n) \times (l_0/(D \times L_\beta))^2$$

The tool need not be modified over (nearly) the entire length $l_0$. It is also possible to modify only a small section of the length, for example in the vicinity of one end of the tool. Thus, a larger portion of the tool is left available in cylindrical shape. This offers the possibility to use the cylindrical portion for conventional rough machining and to use the modified portion to generate the desired modification on the work piece.

The proposed method is an approximation method for the solution of the given task. When working with the method, there can in certain cases still be undesirable deviations left over; this applies in particular to cases where a short tool is used. The deviations can be of the kind where the specifications in regard to flank twist and/or crowning are not being met with sufficient accuracy. It is also possible that undesirable deviations of the profile angle and also small amounts of height crowning may occur. It is proposed that in such cases the setting data be recalculated with corrected "target data" and, if necessary, to additionally make a profile correction in the dressing of the worm cutter profile.

To summarize the foregoing, the invention provides a method of machining the tooth flanks of substantially cylindrical, but crowning-modified gears through a diagonal generating process employing a worm-shaped tool which is modified with a crowning in the direction of its rotary axis, wherein the crowning can be positive or negative (concave crowning), wherein a flank twist is generated which corresponds to the twisting of the flanks due to the generated crowning, wherein the crowning of the flanks of the work piece is the result of a superposition of a component caused by the crowning of the tool when operating in the diagonal mode with a prescribed diagonal ratio, and a further component which is generated during the machining by varying the distance between the tool and work piece and which corresponds to a natural flank twist, and wherein in order to achieve a required flank twist a controlled superposition of the two components is made by adapting the crowning of the tool to the diagonal ratio.

The invention claimed is:

1. A method for machining the tooth flanks of a cylindrical crowning-modified gear by a diagonal rolling process, said gear having an axis of rotation, said method comprising:
  employing a worm-shaped tool having tooth flanks and an axis of rotation, said tool being modified with crowning in the direction of said axis by changing the pitch of the flanks, the crowning being positive or negative (concave crowning),
  producing a crowning on the gear by superimposing one portion, which results from the crowning of the tool in the diagonal process, and a further portion, which is produced by changing the axial distance between the tool and the workpiece during machining,
  producing a flank twist on the gear by superimposing a natural portion that is independent of how the crowning has been produced, and a further portion dependent upon the amount and profile of the crowning of the tool in the direction of its axis of rotation and upon the diagonal ratio defined by a ratio of the displacement of the tool along the tool axis of rotation and the displacement of the gear along the gear axis of rotation,
  wherein in order to produce a target crowning and a target twist, the natural portion of the twist is determined from the target crowning and the further portion of the twist due to matching the crowning of the tool and the diagonal ratio being determined such that as a result thereof, an actual twist is produced, and the further portion of the crowning is determined by changing the axial distance such that as a result thereof, an actual crowning is produced,
  comparing the target twist and crowing to the actual twist and crowning to determine any deviation therebetween and if so,
  providing corrected target values for twist and/or crowning, and
  repeating said method to achieve said target twist and crowning.

2. Method according to claim 1 wherein the crowning of the tool is constituted by a continuous change of the helical pitch of the flanks from one end of the worm tool to the other end.

3. Method according to claim 2, wherein the change of the helical pitch is proportionate to the distance from the end of the worm tool.

4. Method according to claim 2 wherein the maximum pitch of one flank at one end of the worm tool coincides with the minimum pitch of the other flank at the same end of the worm tool and vice versa.

5. Method according to claim 1 wherein the diagonal ratio for the machining $$D = (Y_e - Y_a)/(Z_e - Z_a)$$

is specified, and wherein the natural flank twist $$S_{nat} = k_1 \times c_\beta,$$

the compensating component of the flank twist $$S_{ks} = S_s - S_{nat},$$

the component of the work piece crowning which results from the crowning of the tool $$c_{\beta y} = S_{ks} \times D/k_2,$$

and the component of the work piece crowning which is to be generated by varying the axis distance during the machining $$c_{\beta x} = c_\beta - c_{\beta y}$$

are calculated, wherein the constants $k_1$ and $k_2$ each represent a combination of the constants which are required in order to calculate the relationships between $c_{\beta x}$ and $S_x$, and between $c_{\beta y}$ and $S_y$, respectively, from the amounts of the modification at the four corner points of the measurement field, and wherein the flank twist that results from the variation of the axis distance during the machining $$S_x = k_1 \times c_{\beta x},$$

and the flank twist that results from the crowning of the tool when working in the diagonal mode $$S_y = (k_1 + k_2/D) \times c_{\beta y},$$

as well as the total flank twist $$S_{res} = S_x S_y$$

are calculated, and wherein $c_{\beta y}$ is generated by using a tool having a radial crowning (crowning in axial section of the tool) in accordance with the equation $$Z_{abr} = \pm 4 \times c_{\beta y}/(\sin(\alpha_n) \times (D \times L_\beta)^2) \times y^2,$$

wherein the negative sign applies to a concave-crowned tool and wherein, in case the differences $$\Delta c_{\beta s} c_{\beta t} - c_{\beta s} \text{ and/or}$$

$$\Delta S_S = S_t - S_s$$

by which the actual amounts of crowning $c_{\beta y}$ and/or flank twist $S_i$ obtained by using the method deviate from the specified target values are still too large, the process is repeated with corrected values for $c_{\beta s}$ and/or $S_s$, wherein $c_{\beta s}$ and/or $S_s$ are replaced by $$c_{\beta s} + \Delta c_{\beta s} \text{ and/or}$$

$$S_s + \Delta S_s.$$

6. Method according to claim 1 wherein an existing tool which is profiled over a sufficient length is used to generate a different crowning and/or flank twist than was anticipated in designing the tool and the process, characterized in that the desired amounts of crowning and flank twist are generated by adjusting the diagonal ratio and by adjusting the axis distance during the machining.

7. Method according to claim 1 characterized in that in the case of a single-flank machining process the varying of the axis distance during the machining can be replaced by varying the additional rotation of the work piece during the machining, or by a combination of varying the axis distance and the additional rotation during the machining.

8. Method according to claim 1 characterized in that in the case of a single-flank machining process a tool is used in which the crowning is not generated through a variation of the axis distance between the dressing roller and the tool during the movement of the tangential carriage, but through an additional rotation of the tool during the movement of the tangential carriage and/or through an additional linear movement of the tool in the direction of its rotary axis during the movement of the tangential carriage.

9. Method according to claim 1 for the machining of work pieces in which different amounts of crowning and/or flank twist are specified, respectively, for the left flanks and for the right flanks, characterized in that different setups are carried out for the respective profiling of the tool and determination of the machine settings, and that the work piece is generated through single-flank machining.

10. Method according to claim 1 for the machining of work pieces in which different amounts of crowning and/or flank twist are specified, respectively, for the left flank and for the right flank, characterized in that the method is a dual-flank machining process and that different setups are carried out, respectively, for the left flanks and for the right flanks, wherein however the diagonal ratio (D) is selected equal for both setups and $c_{\beta x}$ consists of the superposition of a variation of the axis distance between tool and work piece during the movement of the axial carriage with a simultaneously executed variation of the additional rotation of the work piece during the movement of the axial carriage, and $c_{\beta y}$ is generated in the diagonal mode by a tool in which the tool crowning consists of the superposition of two components, one of which is generated through a variation of the axis distance between the dressing roller and the tool and the second is generated either through an additional rotation of the tool or through an additional linear movement of the tool, said generation of the tool crowning components taking place in the process of profiling during the movement of the tangential carriage.

11. Method according to claim 1 characterized in that, for the machining of work pieces whose flank modification cannot be described by a quadratic parabola, the required modification is subdivided through conventional means into a component 1 which optimally approximates the required modification through a modification with a profile according to a quadratic parabola, and a component 2 which makes up the rest of the required modification, wherein the axis movements required to generate component 2 are superimposed on those that are required to generate component 1.

12. Method according to claim 1 characterized in that the tool being used in each case is a grinding tool which is capable or not capable of being dressed.

13. Method according to claim 1 characterized in that the tool being used in each case is a hob, wherein the characteristics required for the movement and profiling of the tool relate to the envelope surface of the tool, and the movements that are required for the machining of the free surfaces of the tool are carried out additionally.

* * * * *